United States Patent [19]

Bellino

[11] 4,226,504

[45] Oct. 7, 1980

[54] PROTECTION OF OPTICAL FIBERS

[75] Inventor: Robert A. Bellino, Windham Center, Conn.

[73] Assignee: Akzona Incorporated, Asheville, N.C.

[21] Appl. No.: 666,730

[22] Filed: Mar. 15, 1976

[51] Int. Cl.³ ............................................... G02B 5/14
[52] U.S. Cl. ................................................ 350/96.23
[58] Field of Search ........................ 350/96 B, 96 WG

[56] References Cited

U.S. PATENT DOCUMENTS

| 3,699,950 | 10/1972 | Humphrey Jr. et al. | 350/96 B X |
| 3,740,116 | 6/1973 | Andrews Jr. | 350/96 B |
| 3,766,307 | 10/1973 | Andrews, Jr. | 350/96 B X |
| 3,766,374 | 10/1973 | Fairchild | 350/96 B X |
| 3,955,878 | 5/1976 | Nowak | 350/96 B X |

FOREIGN PATENT DOCUMENTS 2023542 11/1971 Fed. Rep. of Germany ........ 350/96 R

OTHER PUBLICATIONS

Velzeboer, C. M. J.; Tiesinga, G., van Rhijn, S., "New Fiber Optics Coagulation for Macular Holes" American Journal of Ophthalmology, Dec. 1971, pp. 1143–1144.

*Primary Examiner*—Stewart J. Levy
*Attorney, Agent, or Firm*—Francis W. Young; David M. Carter

[57] ABSTRACT

There is provided a fiber optic cable wherein optical fibers are protected from breakage or damage utilizing a core having a fiber optic rod or rods intertwined with at least one thread made of nonfiber optic material. The core has an outer jacket over it which may be extruded in a conventional manner.

8 Claims, 3 Drawing Figures

PROTECTION OF OPTICAL FIBERS

BACKGROUND OF THE INVENTION

This invention relates to fiber optic cable. More particularly, it relates to a system for protecting fiber optic rods which are present in the core of a fiber optic cable.

Cables which transmit information from one point to another by the use of light energy and which utilize glass, plastic, or other signal carriers are known as fiber optic cables. When compared to metallic wire electric cables, fiber optic cables are superior in several respects.

One advantage over metallic conductors is that fiber optic rods have more possible signal channels in that they utilize a wider band width than the electromagnetic band width used with metal conductors.

Another advantage of fiber optics over metallic conductors is that in systems using fiber optic rods having low db losses, the efficiency is much greater than metallic conductor systems.

However, metallic conductor systems have one great advantage over fiber optic systems and that is metallic conductors are much stronger than fiber optics since most fiber optic rods are now made of glass. If the fiber optic system is subjected to vibrations, bending, flexing, twisting, or any other mechanical or physical force, quite often the fibers break, whereas in a system utilizing metallic conductors, the chances of breakage are much less.

OBJECTS OF THE INVENTION

It is therefore a general object of this invention to provide a fiber optic cable whose fibers are resistant to damage due to flexing, bending, abrasion, or vibration of the cable.

Another object is to provide a fiber optic cable in which the fibers are protected from mechanical damage.

SUMMARY OF THE INVENTION

In accordance with one form of this invention, there is provided a fiber optic cable having a core, the core including at least one fiber optic member. Adjacent to the fiber optic member there is provided at least one thread whereby the fiber optic is protected from mechanical stress.

BRIEF DESCRIPTION OF THE DRAWINGS

The subject matter which is regarded as the invention is more particularly set forth in the appended claims. The invention itself, however, together with further objects and advantages thereof may be better understood by referring to the following description in conjunction with the accompanying drawings in which:

DESCRIPTION OF THE PREFERRED EMBODIMENT

Figure 1:
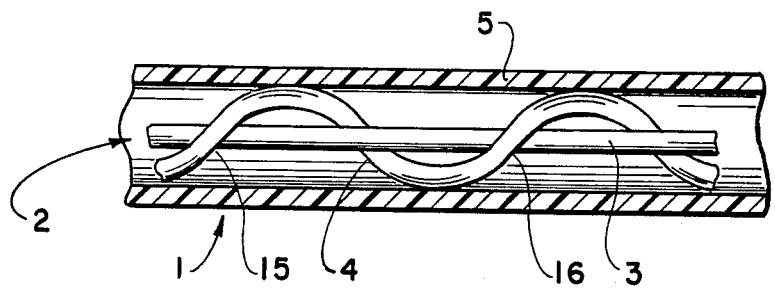
FIG. 1 is a side view of a segment of a fiber optic cable with a portion of the outer jacket removed showing one embodiment of the invention.

Referring now more particularly to FIG. 1, there is provided a fiber optic cable 1 having a core 2. Core 2 includes at least one fiber optic rod 3, however, a plurality of fiber optic rods known as a bundle could be used in place of single rod 3. Such a bundle of fibers may be seen more clearly in reference to FIG. 3. The fiber bundle may further be wrapped with a tape binder (not shown) in order to keep them together.

Referring again to FIG. 1, core 2 also includes fiber optic protection member 4. In this embodiment the protection member is a thread. The thread may have varying ranges of thicknesses; however, it has been found that optimal thicknesses range between 0.1 mm to 1,000 mm. This thread may be made of any of a various number of materials which would provide protection, for example, nylon, polyester, polyethylene, FEP, TFE, dacron, cotton, or other textile materials. As can be seen in FIG. 1, this thread is intertwined with the optical fiber rod 3. Intertwining the thread with the optical fiber rod insures a spaced relation between the optical fiber rod and the outer jacket 5. Adequate protection of the fiber rod should be accomplished with the use of as little thread material as possible. In this regard, it has been found that the optimal distances between each spiral turn 15 and 16 should be in the range of $\frac{1}{4}$ inch to 12 inches.

Outer jacket 5 may be made of a various number of materials such as plastic, polyethylene, or nylon and may be extruded over the core in a known manner such as done in manufacturing metallic conductor communication cable. If the outer jacket is exposed to a mechanical blow, it can be seen that the stress will be absorbed mainly by the jacket and thread 4. Furthermore, by the use of this intertwining of this thread with the fiber, the fiber rod is also protected from its own vibration against the outer jacket, abrasion against the jacket, and other mechanical stresses such as bending and twisting.

Figure 2:
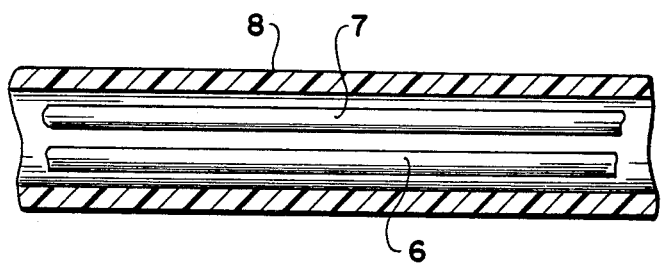
FIG. 2 is a side view of a segment of a fiber optic cable with a portion of the outer jacket removed showing another embodiment of the invention.

Referring now more particularly to FIG. 2, there is provided an optical fiber system including a core having optical fiber rod 6 and thread 7 which is parallel to the optical fiber. In the embodiment in FIG. 2, the optical fiber and the thread are not intertwined with one another. The fact that the thread is in the core will provide some mechanical protection to the optical fiber. Furthermore, and particularly useful in the embodiment in FIG. 2, a plurality of thread protectors may be utilized as shown in FIG. 3 wherein the optical fiber 6 is maintained in a spaced relation to the jacket 8.

Figure 3:
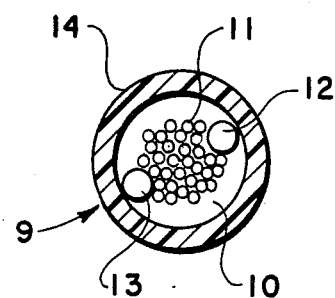
FIG. 3 is a front cross-section view of a fiber optic cable showing other aspects of the invention wherein a plurality of optical fibers and a plurality of protection threads are utilized.

Referring now more particularly to FIG 3, there is shown a cross-sectional end view of an optical fiber system incorporating the present invention. Optical cable 9 includes core 10. Core 10 has a plurality of optical fibers or an optical fiber bundle 11. Each of these optical fibers may be twisted together or they may be parallel to one another. Included in core 10 are protection threads 12 and 13. These core threads may be mutually twisted about the fiber bundle 11 or intermingled with the fiber bundle 11 or they may be substantially parallel to the optical bundle 11. In any event, they provide a space relationship between optical bundle 11 and core jacket 14 as well as provide a cushion effect to mechanical stress. Optical bundle 11 may have a tape wrapped therearound in order to keep the optical bundle together.

So it may be seen that a fiber optics system utilizing a protection thread or threads may now be provided having the advantage in the vast number of communication channels available without the disadvantage of the poor mechanical strength of the fiber optic cables currently in use. It should be emphasized, however, that even though it is envisioned at the present that this invention will have its most significant aid in protecting glass fibers, it also may be used to protect other fibers such as plastic fibers, silica, polyolefin, fluorocarbons, or any communications rod or fiber which may be subjected to and be damaged by mechanical stress such as bending, flexing, abrasion, vibration, and twisting.

From the foregoing description of the illustrated embodiment of this invention, it will be apparent that many modifications may be made therein. It will be understood, therefore, that this embodiment of the invention is intended as an exemplification of the invention only and that the invention is not limited thereto. It is to be understood that it is intended that the appended claims cover all such modifications that shall fall within the true spirit and scope of the invention.

What is claimed is:

1. A fiber optic communication system comprising: a core, said core including at least one glass fiber optic rod and at least one soft, cushiony shock absorbant thread; said rod providing a low loss optical communications channel independent of the remainder of said core; said at least one soft, cushiony shock absorbant thread being substantially spiralled about and being in contact with said fiber optic rod; the contact between said thread and said rod being nonperpendicular to the longitudinal axis of said rod; a jacket covering said core whereby said fiber optic rod is protected from mechanical stress by said soft, cushiony shock absorbant thread.

2. A fiber optic cable comprising: a core, said core including at least one highly frangible fiber optic rod, and a soft, cushiony shock absorbant thread; said rod providing a low loss optical channel independent of the remainder of said core; said thread wound about and being in contact with said fiber optic rod in substantially a spiralled fashion; the contact between said thread and said rod being nonperpendicular to the longitudinal axis of said rod; an outer jacket enclosing said core, whereby said fiber optic rod is protected from mechanical stress by said soft, cushiony shock absorbant thread.

3. A cable as set forth in claim 2 wherein the distance between each adjacent spiral turn is in the range of ¼ inch to 12 inches.

4. A cable as set forth in claim 2 further including a plurality of fiber optic rods.

5. A cable as set forth in claim 2 further including a plurality of threads in said core.

6. A cable as set forth in claim 2, wherein said thread is made from a material which is not adapted to transmit optical signals, but is of sufficient mechanical strength and thickness to protect said fiber optic rod from mechanical stress.

7. A fiber optical cable as set forth in claim 2 wherein said at least one fiber optic rod is substantially straight.

8. A fiber optic cable as set forth in claim 2 wherein said at least one highly frangible fiber optic rod is made of glass.

* * * * *